(12) United States Patent
Moore

(10) Patent No.: US 12,338,553 B2
(45) Date of Patent: Jun. 24, 2025

(54) SYSTEM FOR HANDLING AND PROCESSING YARN

(71) Applicant: SHAW INDUSTRIES GROUP, INC., Dalton, GA (US)

(72) Inventor: Wesley Moore, Rock Springs, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/724,053

(22) PCT Filed: Jan. 17, 2024

(86) PCT No.: PCT/US2024/011757
§ 371 (c)(1),
(2) Date: Jun. 25, 2024

(87) PCT Pub. No.: WO2024/155662
PCT Pub. Date: Jul. 25, 2024

(65) Prior Publication Data
US 2024/0417892 A1    Dec. 19, 2024

Related U.S. Application Data

(60) Provisional application No. 63/480,217, filed on Jan. 17, 2023.

(51) Int. Cl.
*D01H 9/18* (2006.01)
*B25J 9/16* (2006.01)
(Continued)

(52) U.S. Cl.
CPC ............. *D01H 9/187* (2013.01); *B25J 9/162* (2013.01); *B25J 9/1664* (2013.01); *B25J 9/1687* (2013.01); *B25J 15/0033* (2013.01); *B25J 19/022* (2013.01)

(58) Field of Classification Search
CPC .......... D01H 9/187; D01H 9/18; D01H 9/185; D01H 9/00; D01H 9/14; D01H 9/08;
(Continued)

(56) References Cited

U.S. PATENT DOCUMENTS 5,601,252 A * 2/1997 Draghetti ............. B65H 19/123
242/559.3
2018/0011491 A1* 1/2018 Morton .................. B25J 9/1679
(Continued)

FOREIGN PATENT DOCUMENTS

| CN | 213357850 U | 6/2021 |
| CN | 113526229 A | 10/2021 |

(Continued)

OTHER PUBLICATIONS

Machine translation CN113771057 (Year: 2021).*
(Continued)

*Primary Examiner* — Uyen T Nguyen
(74) *Attorney, Agent, or Firm* — Ballard Spahr LLP

(57) ABSTRACT

An apparatus for servicing a twisting machine. The apparatus includes an automated guided vehicle (AGV), a robotic arm having an end effector coupled to the AGV, and a rack carried by the AGV. The rack is configured to hold a plurality of empty tubes and a plurality of yarn packages. A controller that is configured to cause the robotic arm to grip, by the end effector, a handle of a row of the twisting machine, lower a receptacle of the twisting machine to a loading position, remove an empty tube from a first receptacle of the at least one receptacle, place the empty tube on the rack, lift a yarn package from the rack, place the yarn package on the first receptacle, grip the handle of the row of the plurality of rows of the twisting machine, and raise the at least one receptacle to the operational position.

23 Claims, 13 Drawing Sheets

(51) Int. Cl.
*B25J 15/00* (2006.01)
*B25J 19/02* (2006.01)

(58) Field of Classification Search
CPC . D01H 9/02; B25J 9/0096; B25J 9/162; B25J 9/1664; B25J 9/1679; B25J 15/0033; B25J 19/022
See application file for complete search history.

(56) References Cited

U.S. PATENT DOCUMENTS

| 2020/0031608 | A1* | 1/2020 | Kurtz | B65H 67/065 |
| 2021/0404094 | A1* | 12/2021 | Zhang | D01H 9/001 |
| 2022/0074084 | A1* | 3/2022 | Zhang | D01H 9/00 |

FOREIGN PATENT DOCUMENTS

| CN | 113771057 | * | 12/2021 | B25J 11/00 |
| CN | 114000232 | * | 2/2022 | D01H 1/18 |
| EP | 1502975 | A2 | 7/2004 | |

OTHER PUBLICATIONS

Machine translation CN114000232 (Year: 2022).*
PCT International Search Report and Written Opinion for PCT/US24/11757, dated Apr. 25, 2024.

\* cited by examiner

SYSTEM FOR HANDLING AND PROCESSING YARN

CROSS-REFERENCE TO RELATED APPLICATION

This is a U.S. National Phase Application of International Application No. PCT/US2024/011757 filed Jan. 17, 2024, which claims priority to and the benefit of the filing date of U.S. Provisional Patent Application No. 63/381,838, filed Jan. 17, 2023, the entirety of which is hereby incorporated by reference herein.

FIELD

This disclosure relates to systems and methods for handling yarn packages.

BACKGROUND

Conventionally, fiber packages (fiber wound around a tube) for supplying yarn twisting machines are handled by an operator. The operator receives a pallet of yarn packages, manually positions the yarn packages on the yarn twisting machine, and then transports yarn packages formed by the twisting machine to a creel of a heat set. This requires a substantial number of operators and exposes the operators to typical occupational hazards. Accordingly, a way to reduce direct operator interaction is desirable.

SUMMARY

Described herein, in various aspects, is an apparatus for servicing a twisting machine having a plurality of rows, each row having at least one receptacle for receiving a yarn package and a handle for moving the at least one receptacle about and between a loading position and an operational position. The apparatus comprises an automated guided vehicle (AGV) and a robotic arm coupled to the AGV, wherein the robotic arm comprises an end effector. A rack is carried by the AGV. The rack is configured to hold a plurality of empty tubes and a plurality of yarn packages. At least one controller is configured to cause the robotic arm to: grip, by the end effector, the handle of a row of the plurality of rows of the twisting machine; lower, by the handle, the at least one receptacle to the loading position; remove, by the end effector, an empty tube from a first receptacle of the at least one receptacle; place the empty tube on the rack; lift, by the end effector, a yarn package from the rack; place the yarn package on the first receptacle; grip, by the end effector, the handle of the row of the plurality of rows of the twisting machine; and raise, by the handle, the at least one receptacle to the operational position.

In another aspect, a system comprises an apparatus and the twisting machine. The system can further comprise a depalletizing station. The system can further comprise a heat set having a creel. The apparatus can be configured to load yarn packages onto the creel of the heat set.

DETAILED DESCRIPTION

Figure 1:
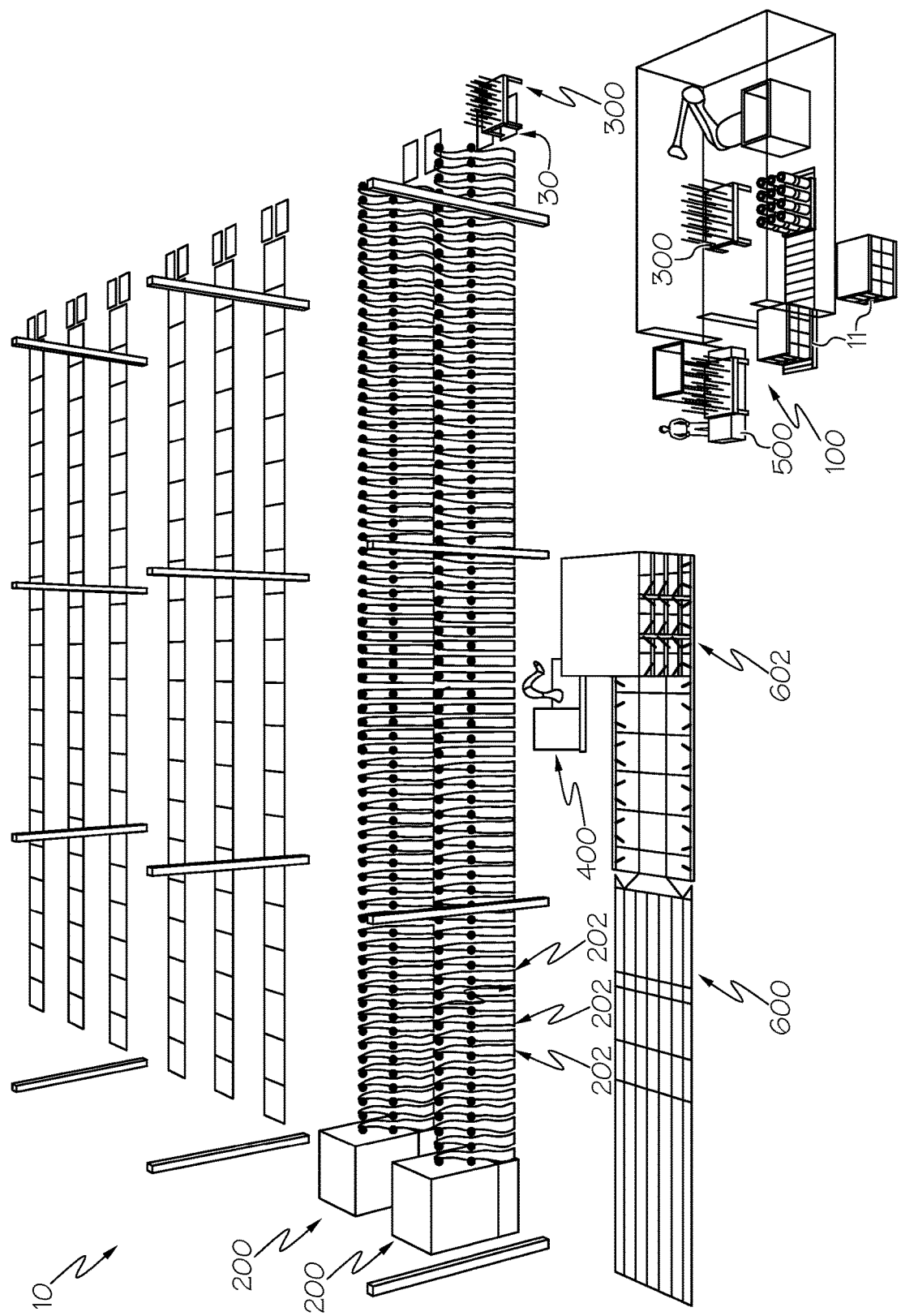
FIG. 1 is a perspective view of a system for handling and processing yarn as disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" can optionally include plural referents unless the context clearly dictates otherwise. For example, use of the term "a package" can represent disclosure of embodiments in which a single such package is provided, and unless the context dictates otherwise, can also represent disclosure of embodiments in which a plurality of such packages are provided.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, in some optional aspects, when values are approximated by use of the terms "approximately," "substantially," or "generally," it is contemplated that values within up to 15%, up to 10%, up to 5%, or up to 1% (above or below) of the particular value can be included within the scope of those aspects. When used with respect to an identified property or circumstance, "substantially" or "generally" can refer to a degree of deviation that is sufficiently small so as to not measurably detract from the identified property or circumstance, and the exact degree of deviation allowable may in some cases depend on the specific context.

As used herein, the terms "optional" or "optionally" mean that the subsequently described event or circumstance may or may not occur, and that the description includes instances where said event or circumstance occurs and instances where it does not.

The word "or" as used herein means any one member of a particular list and, unless context dictates otherwise, can optionally include any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

The term "yarn" as used herein refers to a continuous strand or bundle of fibers. Such yarns can include, for example and without limitation, monofilament yarns, bulk continuous fiber yarn, staple fiber yarn, fibrillated yarns, multifilament yarns, twisted yarns, wrapped yarns, and the like.

Introduction

Figure 11:
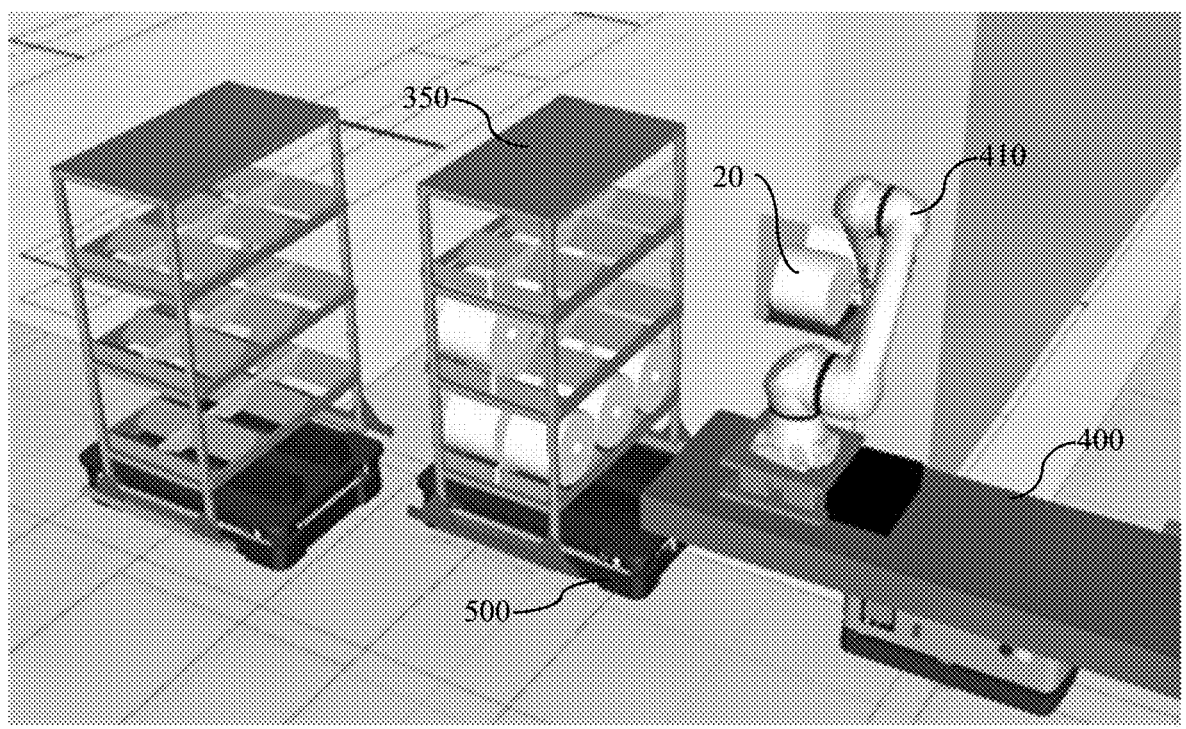
FIG. 11 is a partial perspective view of a heat set of the system of FIG. 1, with the first apparatus loading doffed packages onto a rack.

Disclosed herein, and with reference to FIG. 1, is a system 10 for automating yarn handling. The system can receive a pallet 11 comprising a plurality of yarn packages 12 at a depalletizing station 100. The depalletizing station 100 can remove dunnage (wrapping material, etc.) from the pallet 11 and stack the yarn packages 12 on a rack 300. The system 10 can then deliver the yarn packages 12 that have been placed on the rack 300 to a twisting machine 200. The twisting machine 200 can form twisted yarn packages 20 (FIG. 11). The system doffs twisted yarn packages 20 from the twisting machine 200 and delivers the twisted yarn packages 20 to a creel of a heat set 600.

Depalletizing Station

Figure 2:
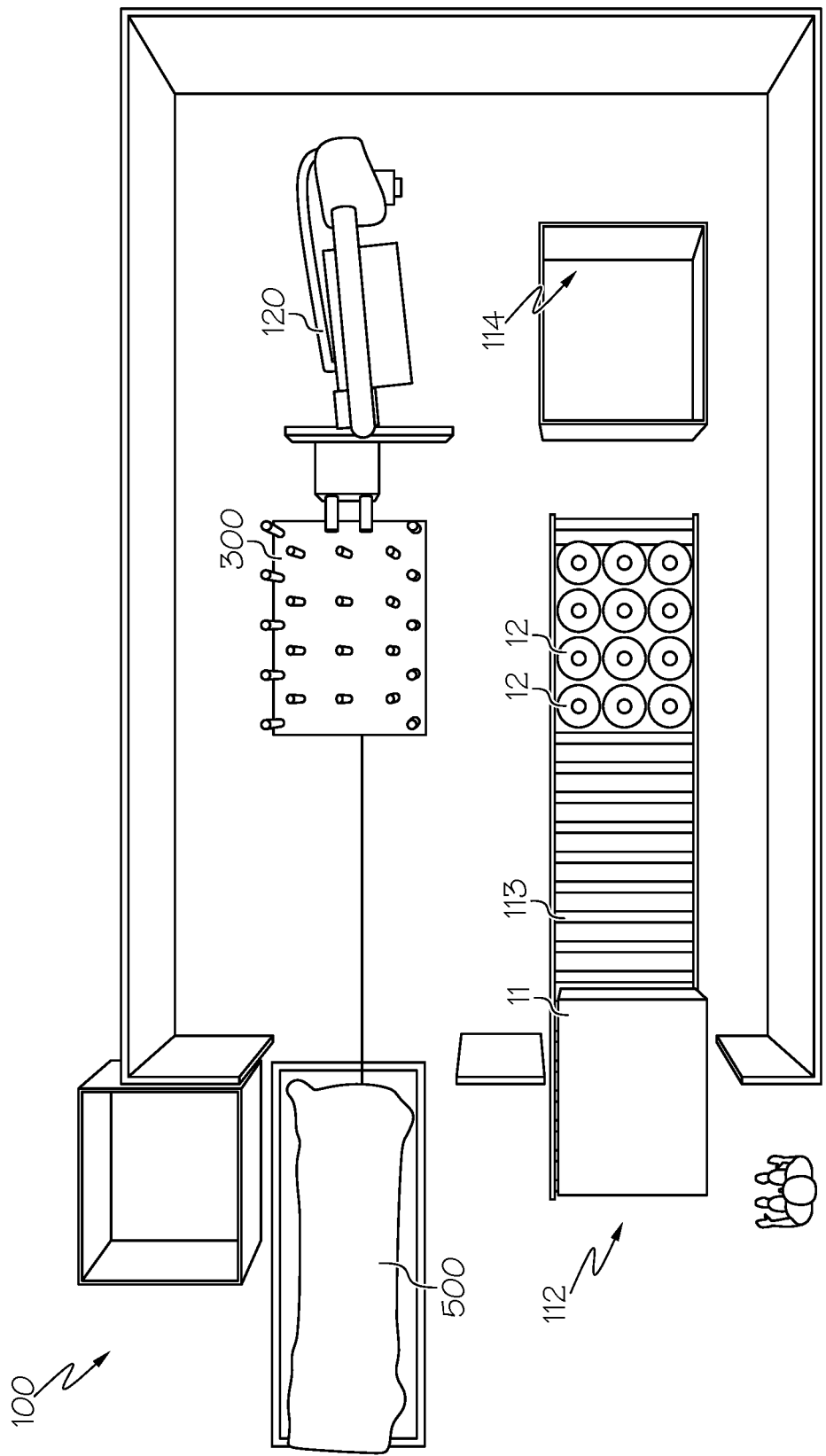
FIG. 2 is a top plan view of a depalletizing station of the system of FIG. 1.

With reference to FIG. 2, the depalletizing station 100 can comprise a robotic arm 120. The depalletizing station 10 can be configured to receive a pallet 110 comprising a plurality of yarn packages 12 at a first location 112. In some aspects, the plurality of yarn packages 12 can comprise or consist of monofilament yarn. In other aspects, the yarn packages can comprise any fiber type, including, but not limited to, bulk continuous filament yarn. However, it is contemplated that other yarn types can be provided on the yarn packages 12. The first location 112 can comprise a conveyor 113 (e.g., a belt conveyor and/or a plurality of rollers) that can carry the pallet 110 toward the robotic arm 120.

The robotic arm 120 can be configured to remove the dunnage from the pallets 110. For example, the robotic arm 120 can comprise a vacuum end effector for gripping dunnage. The robotic arm 120 can dispose of the removed dunnage in a waste area 114. In some aspects, the waste area 114 can have a waste container therein for receiving the removed dunnage.

The robotic arm 120 can be configured to stack the yarn packages 12 from the pallet 110 onto a rack 300. For example, in some aspects, the robotic arm 120 can comprise a gripper that is configured to contact outer surfaces of a yarn package 12 for holding and placing the yarn package. Optionally, in these aspects, the gripper can comprise a plurality of (e.g., a pair of) gripping elements that are movable toward and away from each other for gripping the outer surfaces of the yarn packages 12. In other aspects, the gripper can be configured to grip the yarn packages from within the tube of the yarn package. For example, the gripper can comprise a plurality of gripping elements that are movable radially outwardly from each other to grip the tube.

In some aspects, the pallet 11 can comprise a plurality of stacked layers of yarn packages 12. The layers can be separated by dividers, and the entire pallet can be wrapped in plastic. The robotic arm 120 can first remove the plastic wrap and dispose of the plastic wrap in the waste area 114. The robotic arm 120 can then transfer a layer of yarn packages to the rack 300. The robotic arm 120 can then remove a divider to expose a layer of yarn packages below, placing the divider in the waste area 114. The robotic arm 120 can then transfer the next layer of yarn packages 120 to the rack 300. The above sequence can be repeated until all of the layers of yarn are transferred to the rack 300. The robotic arm 120 can then transfer the base of the pallet to a base stacking area to make room for the next pallet in the first location 112.

Delivery of Packages to Twisting Machine

Figure 4:
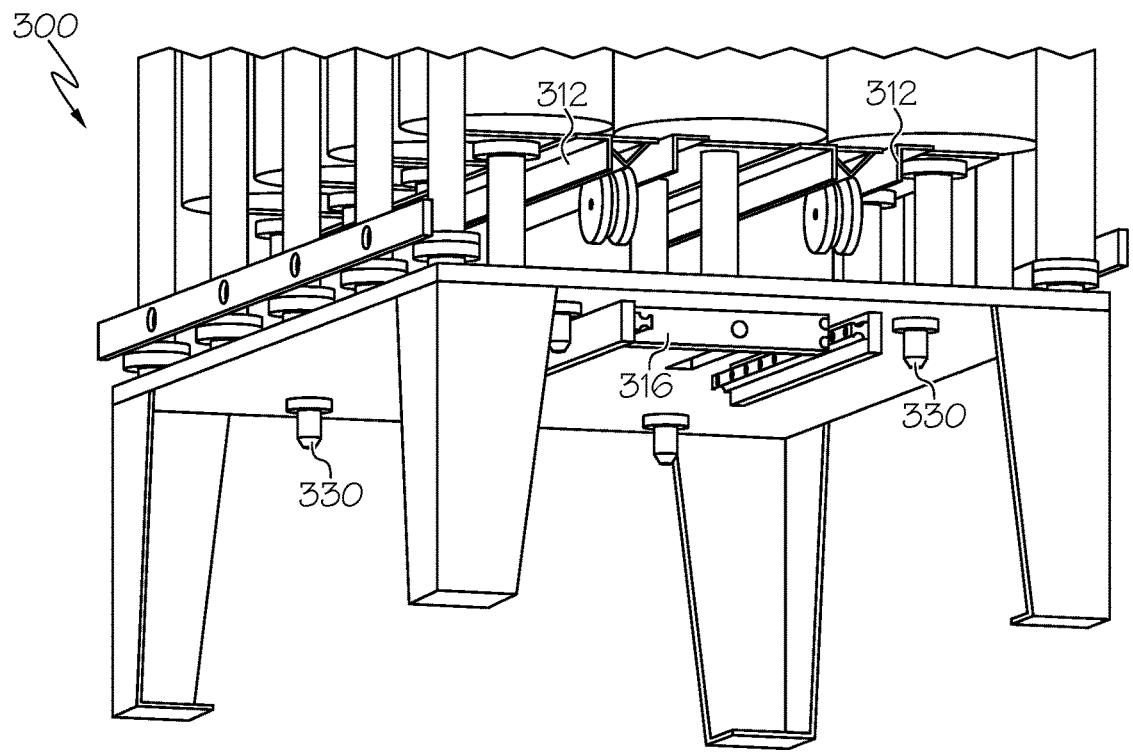
FIG. 4 is a lower partial perspective view of the rack of FIG. 3.
Figure 6:
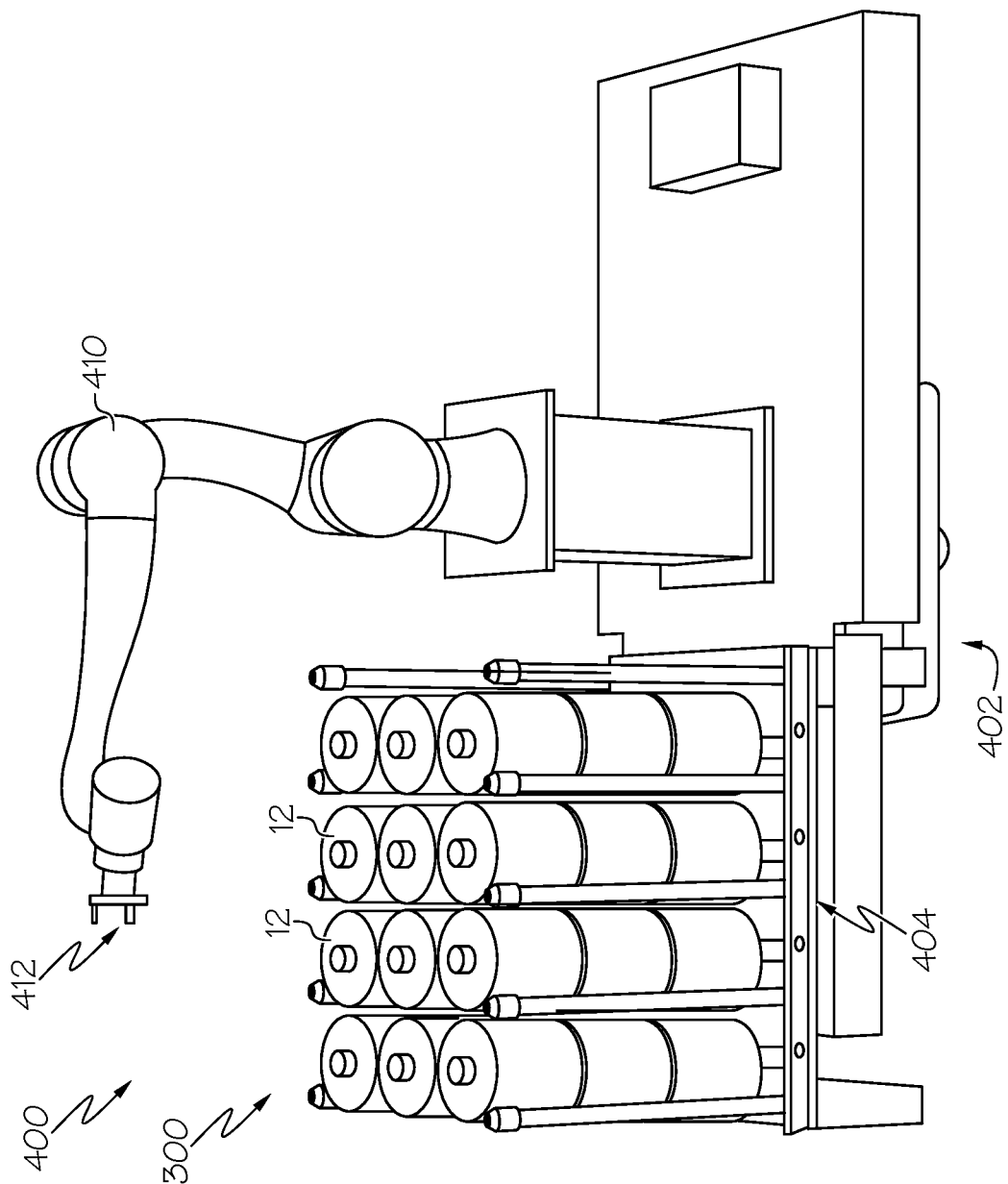
FIG. 6 is a perspective view of a first apparatus for handling yarn packages as disclosed herein.
Figure 7:
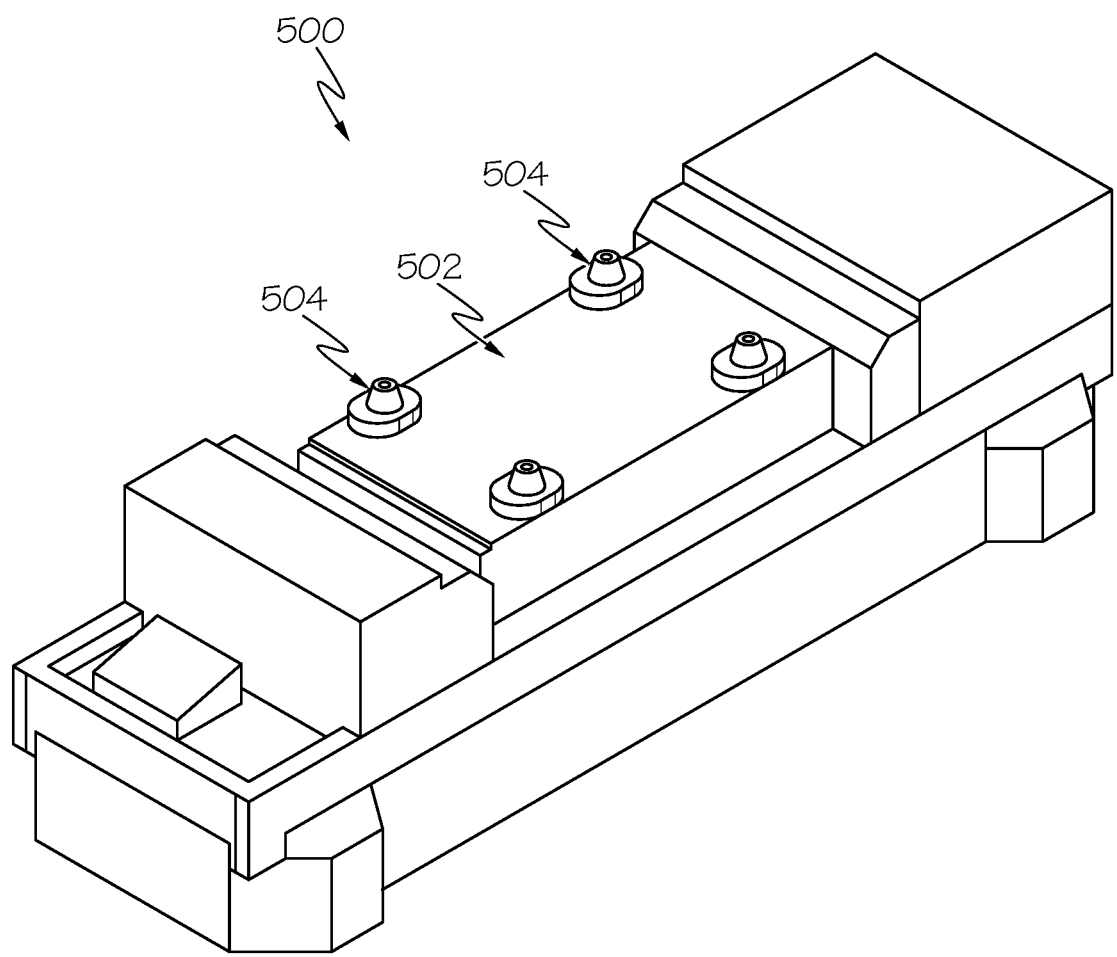
FIG. 7 is a perspective view of a second apparatus for transporting yarn packages as disclosed herein.

Referring to FIGS. 6 and 7, an apparatus comprising an automated guided vehicle (AGV) can deliver the yarn packages 12 to the twisting machine 200. In some aspects, referring to FIG. 6, a first apparatus 400 can carry the rack 300 to the twisting machine 200. In alternative aspects, a second apparatus 500 can carry the rack 300 to a staging area 30 before the rack is ultimately delivered to the twisting machine 200 by the first apparatus 400. In exemplary aspects, the first apparatus 400 and/or the second apparatus 500 can move under the rack and move upwardly (e.g., via a scissor lift or a riser 502) to pick up the rack 300. As illustrated in FIG. 7, the second apparatus 500 can comprise one or more features 504 (e.g., vertically extending projections) that engage the rack 300 to inhibit movement of the rack relative to the second apparatus 500. In some aspects, the one or more features 504 can comprise tapered (e.g., frustoconical) surfaces that facilitate positioning of the rack relative to the second apparatus 500. In some aspects, the first apparatus 400 can comprise similar features. Referring also to FIG. 4, the rack 300 can comprise downwardly extending projections 330 that are configured to engage corresponding features (e.g., recesses) in the first and/or second apparatuses 400, 500.

Figure 8:
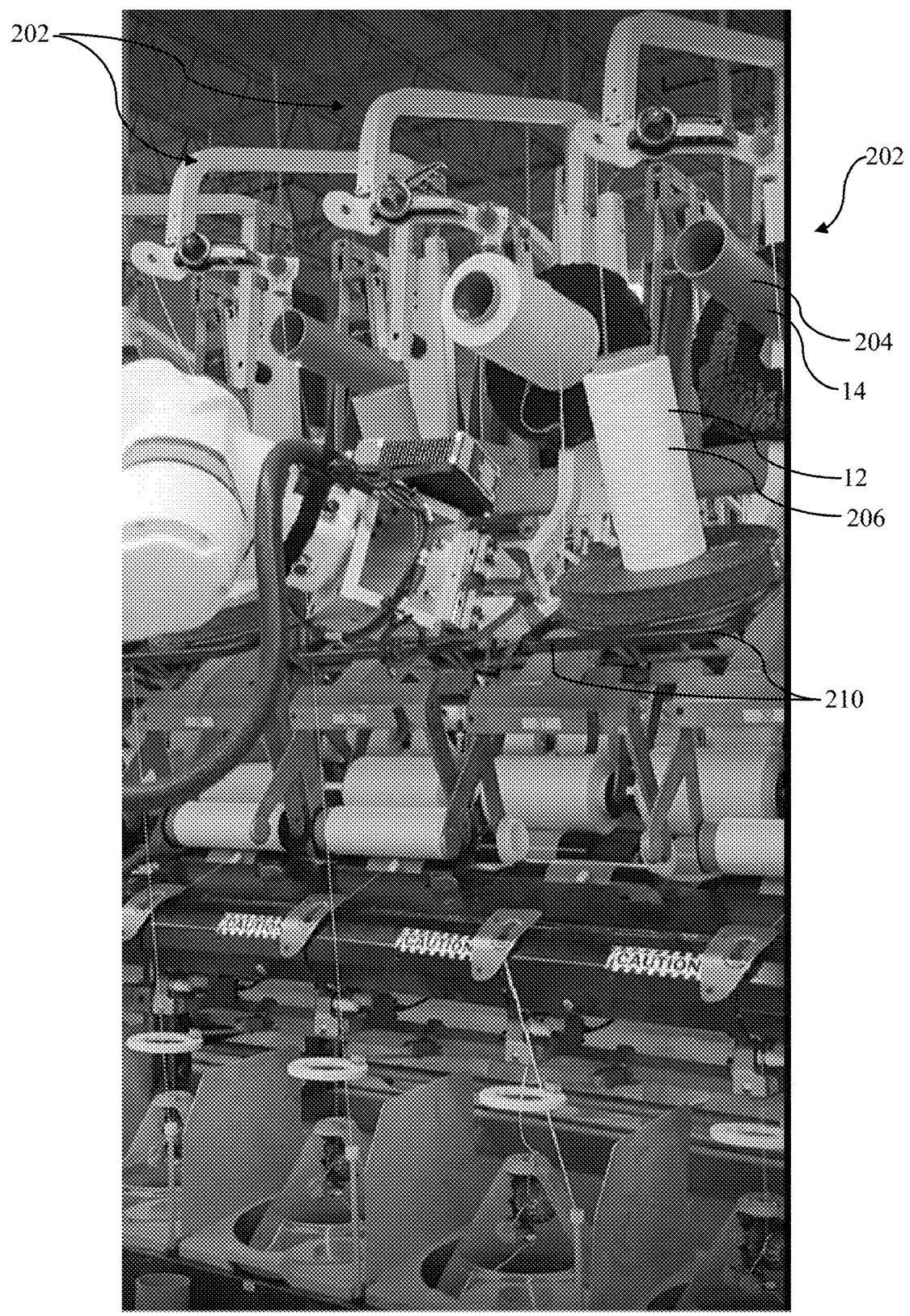
FIG. 8 is a partial perspective view of a yarn twisting machine as disclosed herein, with a row in an operational position.
Figure 9:
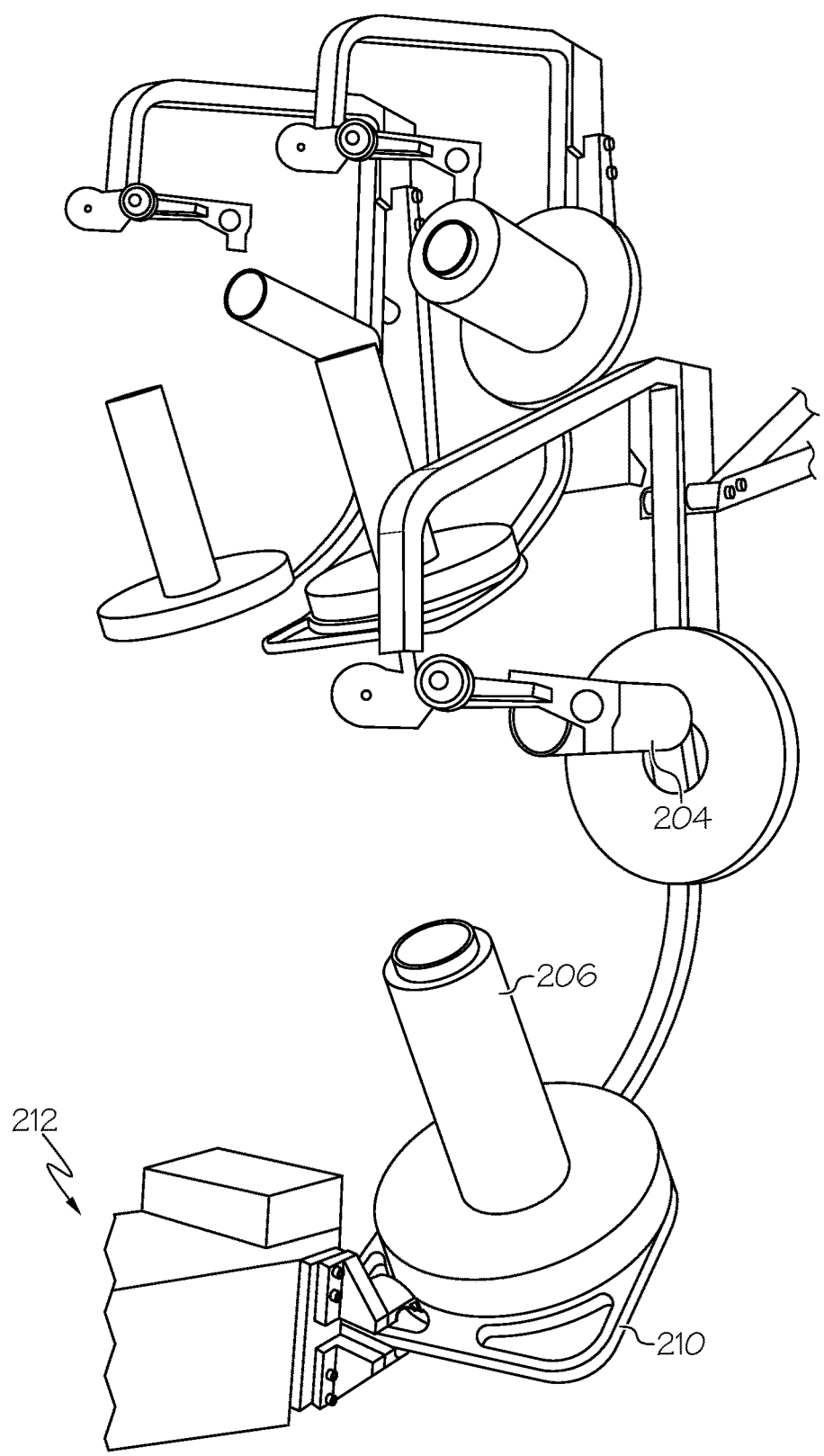
FIG. 9 is a partial perspective view of the yarn twisting machine of FIG. 8, with the row in a loading position.

As shown in FIGS. 1 and 8-9, the twisting machine 200 can comprise a plurality of rows 202. Each row 202 can have at least one receptacle for receiving a yarn package 12. For example, each row 202 can comprise an upper receptacle 204 and a lower receptacle 206. The receptacles can each comprise a projection that can be received into a tube of a yarn package 12. For example, the upper receptacle 204 and the lower receptacle 206 can each comprise a cylindrical outer surface that permit the yarn package to rotate relative to the receptacle. Each row 202 can further comprise a handle 210. The handles 210 can be conventional handles for moving the at least one receptacle about and between a loading (lowered) position and an operational (raised) position. The lowered position for each receptacle can be vertically lower than, and laterally outward of, the operational position to permit unimpeded access for, conventionally, an operator to service the position by removing the remaining empty tube of a spent package and replacing the empty tube with a yarn package.

Referring to FIG. 6, the first apparatus 400 can comprise an AGV 402. A robotic arm 410 can be coupled to the AGV 402. The robotic arm 410 can be, for example, a 6-axis robotic arm or, in some aspects, a 7-axis robotic arm. The robotic arm 410 can comprise an end effector 412. The first apparatus 400 can define a shelf 404 that is configured to be inserted under the rack 300 and lifted, by the AGV 402 (e.g., via a scissor lift), to lift the rack.

Figure 14:
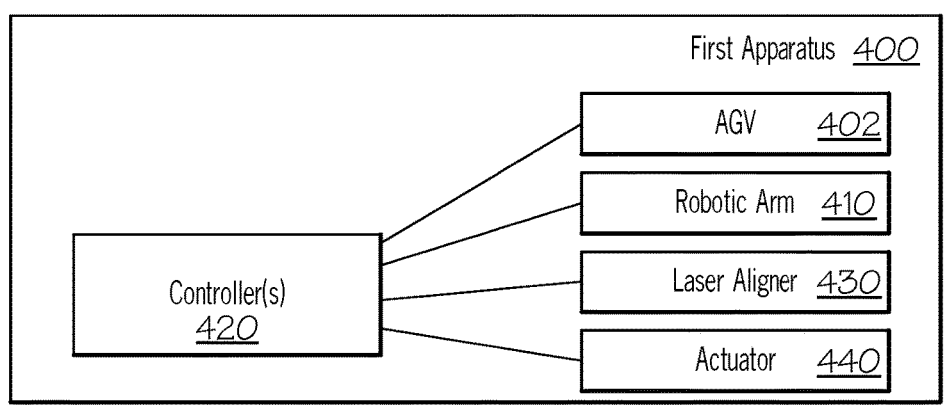
FIG. 14 is a block diagram of the first apparatus as disclosed herein.

Referring also to FIGS. 8-9, the first apparatus 400 can further comprise at least one controller 420 (FIG. 14) that is configured to cause the robotic arm 410 to grip, by the end effector 412, the handle 210 of a row 202 of the plurality of rows of the twisting machine 200. The controller 420 can further be configured to cause the robotic arm 410 to lower, by the handle 210, the at least one receptacle (e.g., the first and second receptacles 204, 206) to the loading position (FIG. 9). The controller 420 can further be configured to cause the robotic arm 410 to remove, by the end effector, an empty tube 14 (what remains after all of the yarn has been removed from the yarn package 12) from a first receptacle (e.g., the upper receptacle 204), place the empty tube 14 on the rack 300. The controller 420 can further be configured to cause the robotic arm 410 to lift, by the end effector, a yarn package from the rack 300, place the yarn package on the first receptacle, grip, by the end effector, the handle of the row of the plurality of rows of the twisting machine, and raise, by the handle, the upper and lower receptacles 204, 206 to the operational position (FIG. 8).

Figure 10:
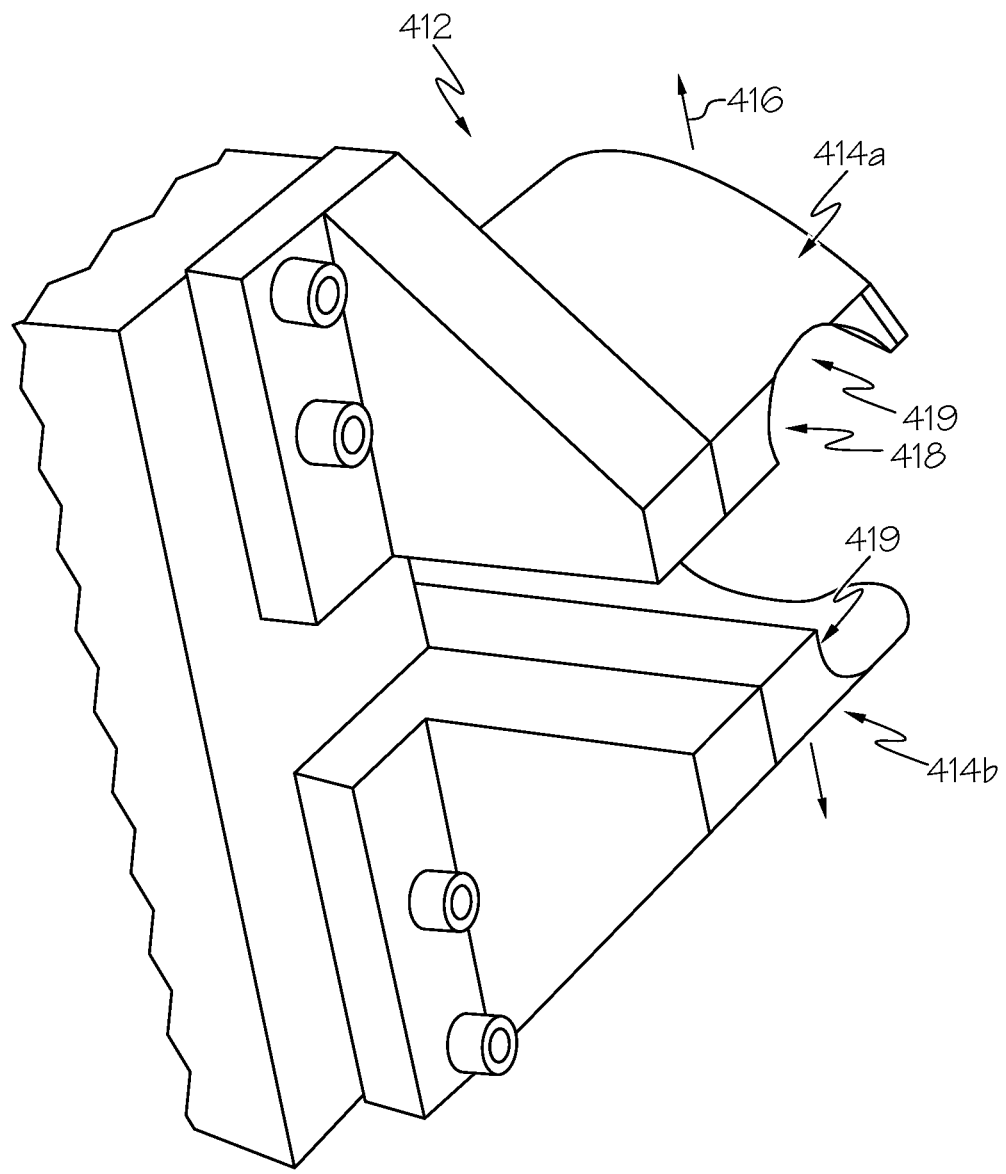
FIG. 10 is a partial perspective view of an end effector of the robot of the first apparatus of FIG. 6.

Referring to FIGS. 6 and 10, in some aspects, the end effector 412 can comprise first and second grippers 414a,b that are configured to move radially outwardly from each other along a gripping axis 416 to bias against inner surfaces of a tube 14 of a yarn package 12 or an empty tube. In this way, the robotic arm 410 can handle the yarn packages and empty tubes. In some optional aspects, outer surfaces of the first and second grippers 414a,b can comprise hemicylindrical surfaces.

In some aspects, the first apparatus 400 can be configured to remove, by the end effector 412, the empty tube 14 from a first receptacle (the upper receptacle 204 or the lower receptacle 206) while a yarn package on a second receptacle (the other of the upper or lower receptacle) supplies yarn to the yarn twisting machine. Accordingly, the controller 420 can control movement of the robotic arm 410 to stay away from the yarn of the yarn package 12 on the receptacle that is actively supplying the twisting machine 200.

In some aspects, the first and second grippers 414a,b can define therebetween a channel 418. The first and second grippers 414a,b can be configured to move toward each other along the gripping axis 416 to at least partly (optionally, entirely) enclose/encircle the handle of the row of the plurality of rows within the channel 418. In some aspects, the channel 418 can be cylindrical or generally cylindrical. In some aspects, the first and second grippers 414a,b can define hemi-cylindrical cutouts 419 that cooperate to define the channel 418. The hemi-cylindrical cut-outs 419 can extend perpendicularly to the gripping axis 416. The end effector 412 can permit pivotal or sliding movement of the handle 210 relative to the end effector.

The controller(s) 420 (FIG. 14) can control movement of the robotic arm 410 so that the robotic arm moves along the same path as if a human operator were moving the row 202 of the twisting machine. In some aspects, the at least one controller 420 can be configured to cause the robotic arm 410 to lower, by the handle, the upper and lower receptacles 204, 206 by moving the end effector 412 along an arcuate path. Optionally, in these aspects, the arcuate path can have a constant radius. In other aspects, the arcuate path can have a variable radius.

In some aspects, the first apparatus 400 can be easily adapted to operate different winders having different paths of movement. In this way, the first apparatus 400 can be adapted for use in different plants or for use in a single plant having different twisting machines 200. In some aspects, the at least one controller 420 can store a plurality of movement patterns (profiles) that correspond to respective travel paths for a plurality of different yarn twisting machines 200. The respective travel paths can correspond to the movement of the handle 210 of each row 202 of a respective yarn twisting machine when moving the receptacle(s) about and between the loading position and the operational position. The at least one controller 420 can permit selection between or among movement patterns of the plurality of movement patterns.

The first apparatus 10 can comprise a laser aligner 430 as is known in the art. The laser aligner 430 can be configured to scan an area to determine an exact location of a feature (e.g., a handle 210, a tube 14, or a position on a creel). For example, data from the scan can be analyzed using conventional techniques (e.g., using conventional software) to determine exact locations of features in order to permit the end effector 412 to grip said features or to position other elements (e.g. packages 12 or empty tubes 14) relative to said features. The analysis can determine a location where the returned data corresponds to a pattern associated with the structure of the feature such as, for example, the handle 210 or a tube 14. Accordingly, in exemplary aspects, the laser aligner 430 can be configured to scan an area to determine a location of the handle 210 of the row 202 of the yarn twisting machine 200. The laser aligner 430 can further be configured to scan an area to determine an exact location of the (empty) tube on each receptacle of each row 202 of the yarn twisting machine 200.

In some aspects, the laser aligner 430 can be configured to scan across a line that extends along a scanning axis (e.g., a vertical axis). The at least one controller is configured to cause the robotic arm 410 to move the laser aligner 430 along an axis (e.g., a horizontal axis) that is perpendicular to the scanning axis. In this way, the laser aligner 430 can be configured to scan an area. For example, the controller 420 can cause the laser aligner 430 to pass across an area where the handle 210 is expected to be. Data from the scan can be analyzed to determine the exact location the location of the handle in order to permit the end effector 412 to grip the handle. The controller 420 can further cause the laser aligner 430 to pass across respective areas where each of the upper and lower receptacles 204, 206 are expected to be. Data from the scan can be analyzed to determine the location of the tubes 14 on the upper and lower receptacles 204, 206 in order to permit the end effector 412 to grip the tubes 14.

The controller(s) 420 can further control picking up and dropping off the rack 300. For example, the controller can cause the AGV 402 to move the first apparatus 400 to a rack drop-off location, for example, once the packages from the rack have been removed, and empty tubes have been placed on the rack. The rack 300 can be configured to couple to the AGV 402 by resting on top of (optionally, being coupled to) the AGV or a surface coupled thereto. Accordingly, at the rack drop-off location, the AGV 402 can be configured to lower to decouple the rack 300 from the AGV.

Rack

Figure 3:
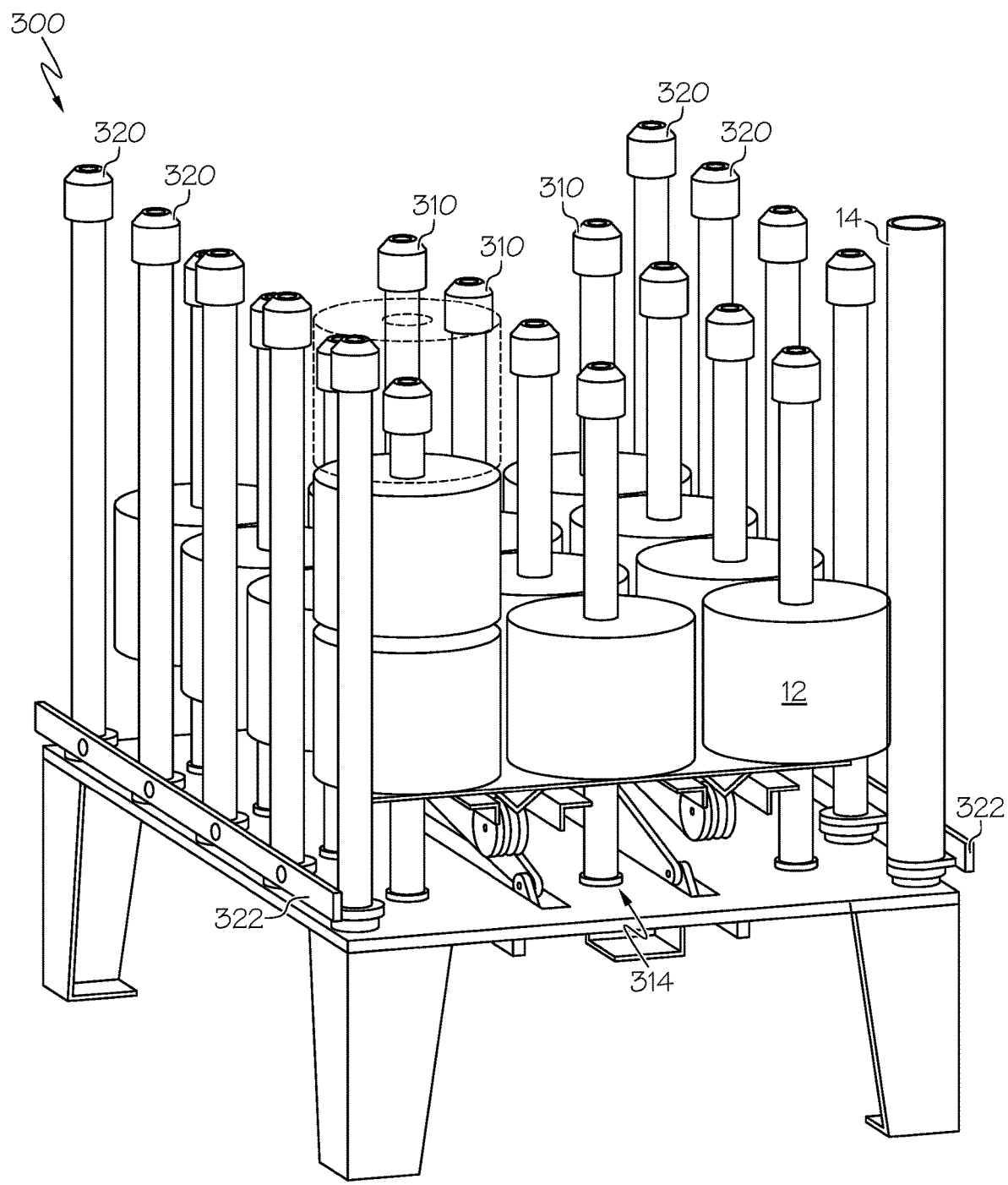
FIG. 3 is a perspective view of a rack of the system of FIG. 1.
Figure 5:
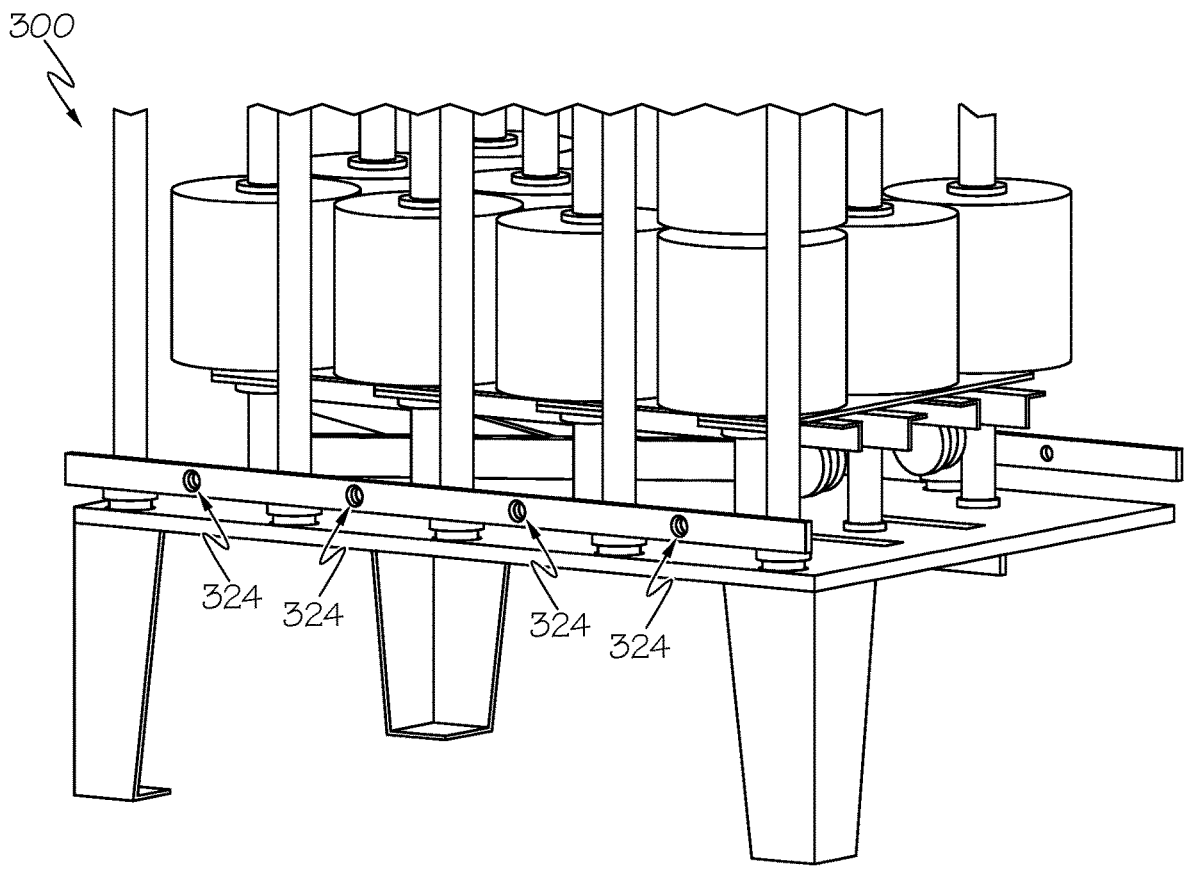
FIG. 5 is a partial perspective view of the rack of FIG. 3.

In some aspects, and with reference to FIGS. 3-5, the rack 300 can comprise a plurality of vertically extending guides 310 that are configured to receive yarn packages thereon. In exemplary aspects, the plurality of vertically extending guides 310 can be arranged in rows and columns. In some aspects, each vertically extending guide 310 of the plurality of vertically extending guides can be configured to receive a plurality of yarn packages (e.g., two yarn packages, three yarn packages, four yarn packages, or more) thereon in a stacked configuration. The rack 300 can comprise a platform 312 that is configured to lift packages upwardly along the vertically extending guides so that at least a portion of the tubes of the packages of a top layer of stacked yarn packages extends above the respective vertically extending guides. (In this way, with the tubes extending above the vertically extending guides, the robot 410 can grip the tubes from the interior.) In exemplary aspects, the platform 312 can comprise a plurality of rails (e.g., angled channel members) that extend transversely to the plurality of vertically extending guides 310. The plurality of rails can be configured to contact lower surfaces of the bottom layer of yarn packages 12 on the rack 300. In some aspects, the rack 300 can comprise a scissor lift 314 that is configured to move the platform 312 upwardly and downwardly. The scissor lift 314 can comprise an actuation arm 316 (FIG. 4). Movement of the actuation arm 316 along a horizontal axis can cause vertical movement of the platform 312. The AGV 402 can comprise an actuator 440 that is configured to move the actuation arm 316. For example, the actuator 440 can comprise a pneumatic or hydraulic piston or electric linear actuator. The actuator 440 can slide the actuation arm 316 axially to effect movement of the platform 312. In some aspects, the actuator 440 can further comprise a feature (e.g., a protrusion, hook, clamp, or the like) for engaging the actuation arm 316.

In some aspects, the rack 300 can further comprise a plurality of vertically extending guides 320 that are configured to receive empty tubes 14. For example, in some optional aspects, the vertically extending guides 320 can be placed along sides of the rack, with the vertically extending guides 310 therebetween. The rack 300 can further comprise lifting arms 322 that extend across a plurality of vertically extending guides 320. The lifting arms 322 can be lifted vertically at lifting points 324 (FIG. 5) to engage lower surfaces of the tubes to lift the tubes upwardly above the vertically extending guides 320. The lifting points 324 can comprise, for example, openings or recesses that can receive a protrusion for effecting vertical movement of the lifting arm 322. The end effector 412 of the robotic arm 410 can grip the tubes that are above the vertically extending guides 320 and place the tubes in a bin or other receptacle for reuse.

In other aspects, the rack 300 can be configured to receive thereon a pallet comprising a plurality of yarn packages. That is, in some optional aspects, the step of transferring yarn packages from the pallet to a separate rack can be omitted. Instead, the pallet 11 comprising the yarn packages 12 can be placed on the rack 300. For example, the rack 300 can comprise a surface upon which the pallet 11 can rest. In some aspects, the rack 300 can comprise at least one support feature (e.g., a circumferential wall or lip) that inhibits the pallet 11 from moving laterally on the rack.

Loading the Heat Set Machine

Figure 12:
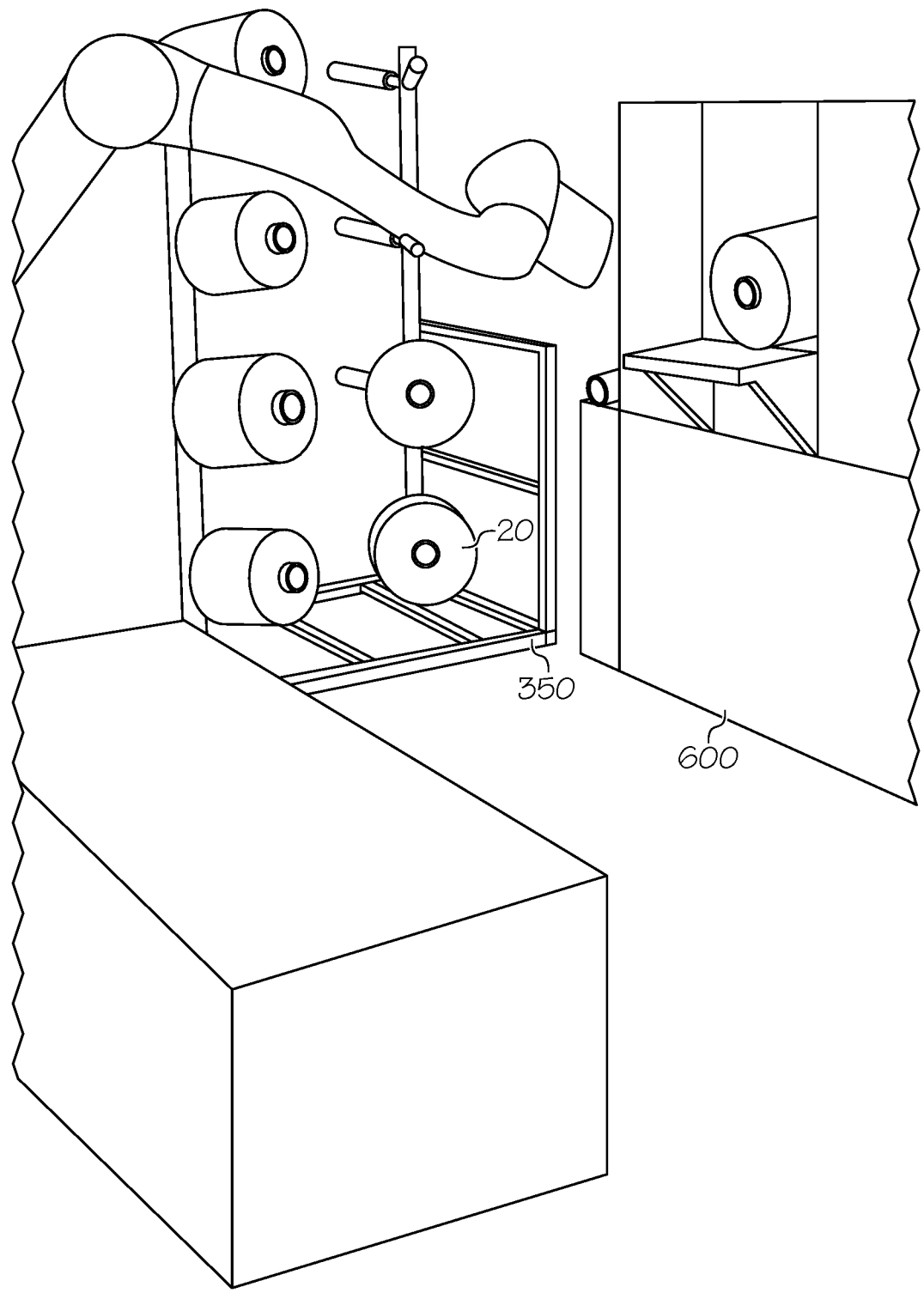
FIG. 12 is another partial perspective view of the heat set of the system of FIG. 1, with the first apparatus loading doffed packages onto the rack.

Referring to FIGS. 11-12, packages 20 doffed from the winder can be loaded onto a rack 350. For example, the first apparatus 400 can receive doffed packages 20 and load them onto a rack 350.

Figure 13:
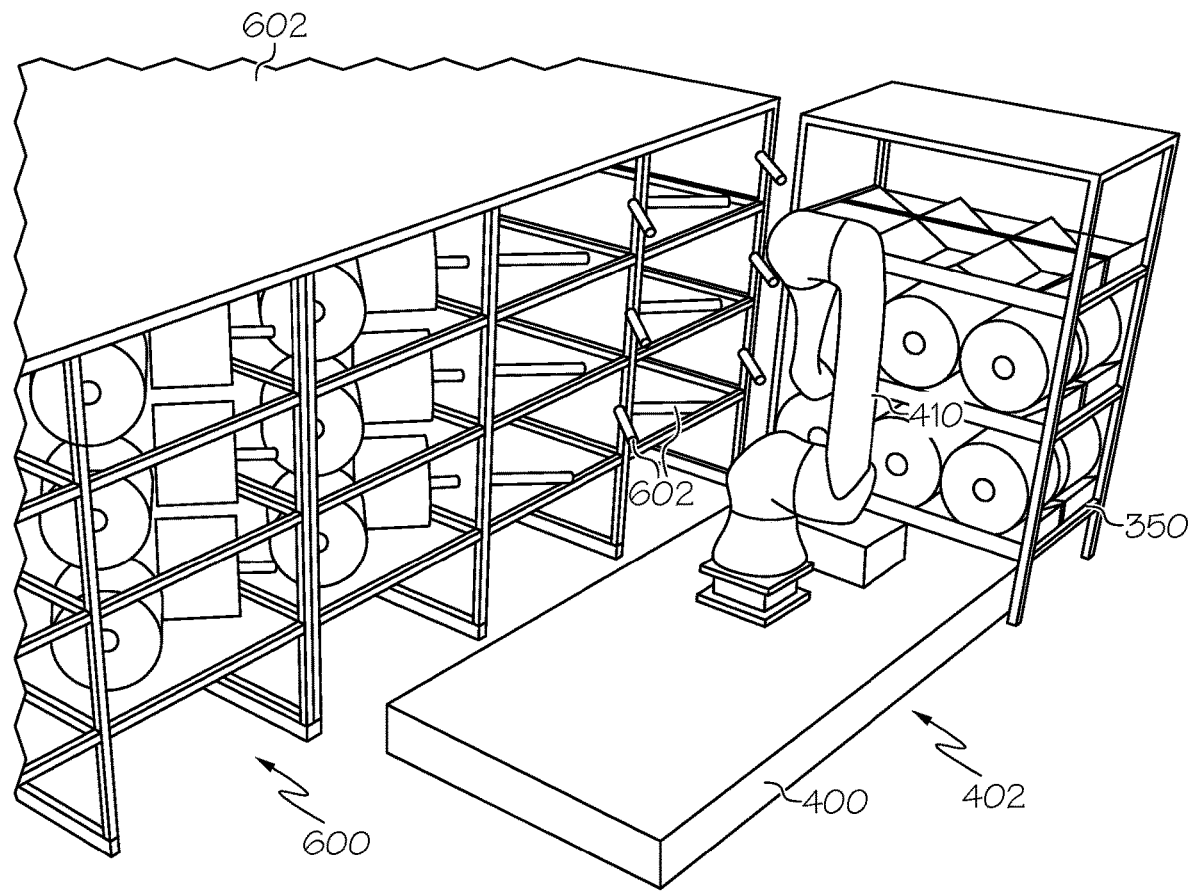
FIG. 13 is partial perspective view of a creel of the heat set of the system of FIG. 1, with the first apparatus loading yarn packages onto the creel.

Referring to FIG. 13, the first apparatus 400 can further be configured to deliver packages 20 to the creel 602 of heat set machine 600. For example, the first apparatus 400 can be positioned under the rack 350 having a plurality of yarn packages 20 thereon. The AGV 402 can elevate an upper surface of the first apparatus 400 to lift the rack 350 and carry the rack to the creel 602.

Using the laser aligner 430 (FIG. 14), the first apparatus 400 can detect positions 604 of the creel 602. The robotic arm 410 can then place yarn packages 20 thereon.

In other aspects, the rack 350 can be transported to another location (e.g., a storage area) via the second apparatus 500 or, more generally, an AGV that does not necessarily include a robotic arm. The first apparatus 400 can later deliver the rack 350 to the creel 602 of the heat set machine 600.

Computing Device

The system 10 can comprise at least one computing device for controlling operation of the system. For example, one or more computing devices can control a plurality of operations, including: movement of the robotic arm 120; dispatch of the AGVs 402; movement of AGVs 402; movement of the robotic arm 410; coordination with the twisting machine 200 and the heat set machine 600; operation of the AGVs. In some optional aspects, a single computing device controls a plurality of such operations. In some aspects, the system 10 can comprise a plurality of computing devices that operate in coordination. For example, a first computing device (e.g., a controller) can control movement of the robotic arm 420, and a second computing device can coordinate movement of the AGV 402. Still another computing device can dispatch AGVs 402. Still another computing device can provide an operator with an interface at a human machine interface for permitting the operator to control aspects of the system. Each of said computing devices can optionally be embodied in accordance with the computing device 1001 as further disclosed herein.

Figure 15:
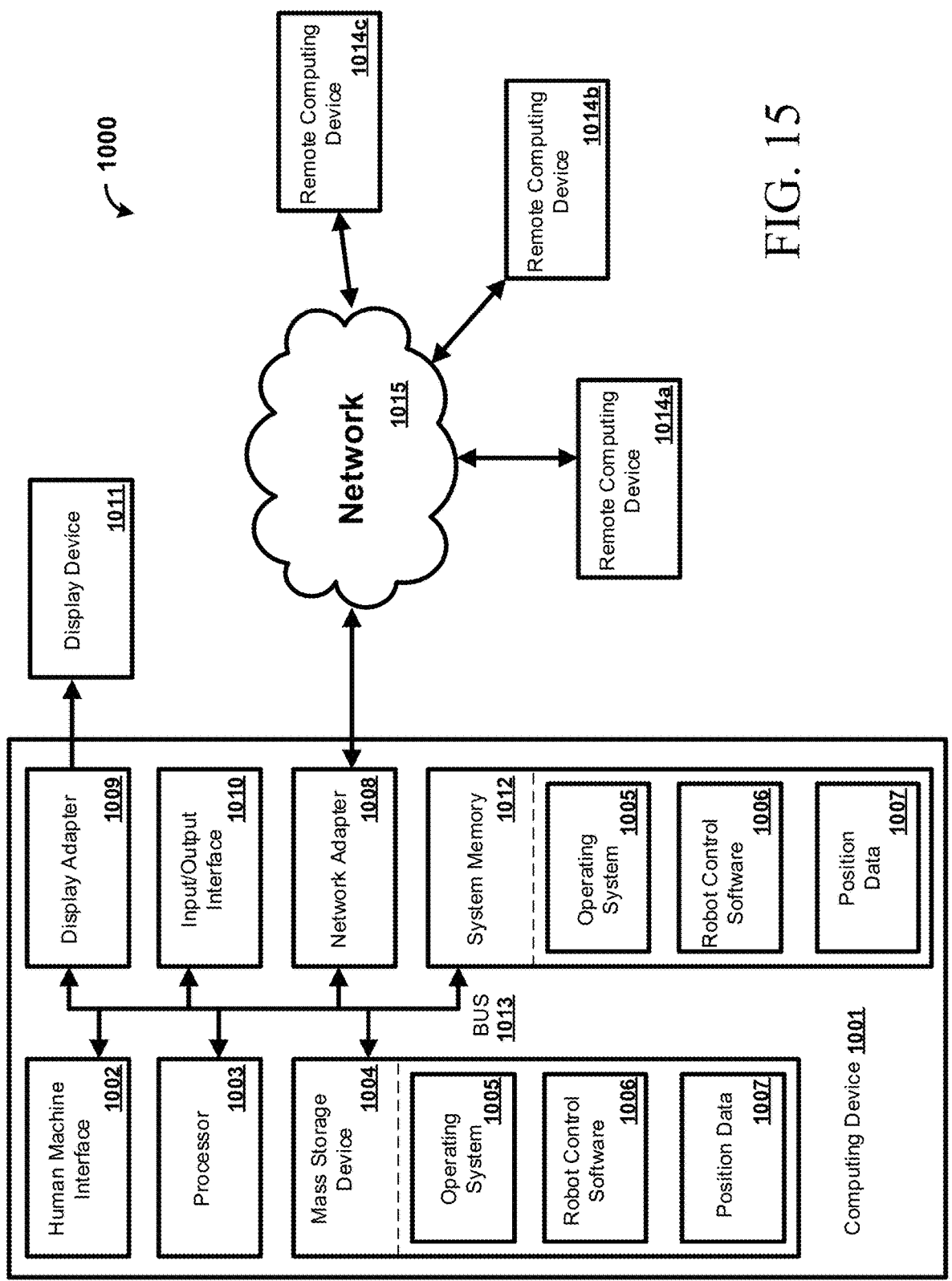
FIG. 15 is a block diagram of a computing system for controlling operation of the system as disclosed herein.

FIG. 15 shows an exemplary operating environment 1000 including an exemplary configuration of a computing device 1001 for use with the system 10 (FIG. 1).

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as position data 1007 and/or program modules such as operating system 1005 and robot control software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and robot control software 1006 may be stored on the mass storage device 1004. One or more of the operating system 1005 and robot control software 1006 (or some combination thereof) may comprise program modules and the robot control software 1006. The position data 1007 may also be stored on the mass storage device 1004. The position data 1007 may be stored in any of one or more databases known in the art. The databases may be centralized or distributed across multiple locations within the network 1015.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, a universal serial bus (USB), and/or a THUNDERBOLT port.

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010.

Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. The remote computing devices 1014a,b,c, can perform respective operations of the system. For example, one remote computing device 1014a can be a controller of an AGV. One remote computing device 1014b can control a winding machine. Logical connections between the computing device 1001 and a remote computing device 1014a,b,c may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An apparatus for servicing a twisting machine having a plurality of rows, each row having at least one receptacle for receiving a yarn package and a handle for moving the at least one receptacle about and between a loading position and an operational position, the apparatus comprising:

an automated guided vehicle (AGV);
a robotic arm coupled to the AGV, wherein the robotic arm comprises an end effector;
a rack carried by the AGV, wherein the rack is configured to hold a plurality of empty tubes and a plurality of yarn packages; and
at least one controller that is configured to cause the robotic arm to:
grip, by the end effector, the handle of a row of the plurality of rows of the twisting machine;

lower, by the handle, the at least one receptacle to the loading position;
remove, by the end effector, an empty tube from a first receptacle of the at least one receptacle;
place the empty tube on the rack;
lift, by the end effector, a yarn package from the rack;
place the yarn package on the first receptacle;
grip, by the end effector, the handle of the row of the plurality of rows of the twisting machine; and
raise, by the handle, the at least one receptacle to the operational position.

Aspect 2: The apparatus of aspect 1, wherein the end effector comprises first and second grippers that are configured to move radially outwardly from each other along a gripping axis to bias against inner surfaces of a tube of a yarn package or an empty tube.

Aspect 3: The apparatus of aspect 2, wherein the first and second grippers define therebetween a channel, wherein the first and second grippers are configured to move toward each other along the gripping axis to at least partly enclose the handle of the row of the plurality of rows.

Aspect 4: The apparatus of aspect 3, wherein the channel is cylindrical or generally cylindrical.

Aspect 5: The apparatus of aspect 4, wherein the first and second grippers define hemi-cylindrical cutouts that cooperate to define the channel, wherein the hemi-cylindrical cut-outs extend perpendicularly to the gripping axis.

Aspect 6: The apparatus of any one of the preceding aspects, wherein the at least one controller is configured to cause the robotic arm to lower, by the handle, the at least one receptacle by moving the end effector along an arcuate path having a constant radius.

Aspect 7: The apparatus of any one of the preceding aspects, wherein the at least one controller stores a plurality of movement patterns that correspond to respective travel paths for a plurality of different yarn twisting machines, wherein the respective travel paths correspond to the movement of the handle of each row of a respective yarn twisting machine when moving the at least one receptacle about and between the loading position and the operational position, wherein the at least one controller permits selection between movement patterns of the plurality of movement patterns.

Aspect 8: The apparatus of any one of the preceding aspects, wherein the at least one receptacle further comprises a second receptacle, wherein the apparatus is configured to remove, by the end effector, the empty tube from the first receptacle while a yarn package on the second receptacle supplies yarn to the yarn twisting machine.

Aspect 9: The apparatus of any one of the preceding aspects, wherein the robotic arm is a 6-axis robotic arm.

Aspect 10: The apparatus of any one of the preceding aspects, further comprising a laser aligner, wherein the laser aligner is configured to scan an area to determine a location of the tube on each receptacle of the at least one receptacle of each row of the yarn twisting machine.

Aspect 11: The apparatus of aspect 10, wherein the laser aligner is configured to scan across a line that extends along a scanning axis, wherein the at least one controller is configured to cause the robotic arm to move the scanner along an axis perpendicular to the scanning axis.

Aspect 12: The apparatus of any one of the preceding aspects, wherein the at least one controller is configured to cause the apparatus to:
navigate to a rack drop-off location; and
decouple the rack from the AGV.

Aspect 13: The apparatus of aspect 12, wherein the rack is configured to couple to the AGV by resting on top of the AGV, wherein the AGV is configured to lower to decouple the rack from the AGV.

Aspect 14: The apparatus of any one of the preceding aspects, wherein the AGV is configured to navigate to a rack having yarn packages thereon.

Aspect 15: The apparatus as in any one of the preceding aspects, wherein the rack comprises a plurality of vertically extending guides that are configured to receive packages thereon.

Aspect 16: The apparatus of aspect 15, wherein the plurality of vertically extending guides are arranged in rows and columns.

Aspect 17: The apparatus as in aspect 15 or aspect 16, wherein each vertically extending guide of the plurality of vertically extending guide is configured to receive a plurality of yarn packages thereon in a stacked configuration, wherein the rack comprises a platform that is configured to lift packages upwardly along the vertically extending guides so that at least a portion of the tubes of the packages of a top layer of stacked yarn packages extend above the respective vertically extending guides.

Aspect 18: The apparatus of aspect 17, wherein the rack comprises a scissor lift that is configured to move the platform upwardly and downwardly, wherein the scissor lift comprises an actuation arm, wherein movement of the actuation arm along a horizontal axis causes vertical movement of the platform, wherein the AGV is configured to move the actuation arm.

Aspect 19: The apparatus as in any one of the preceding aspects, wherein the rack comprises a plurality of vertically extending guides that are configured to empty yarn tubes thereon.

Aspect 20: The apparatus of aspect 19, further comprising a structure that is configured to move along at least one vertically extending guide of the plurality of vertically extending guides that are configured to empty yarn tubes thereon, wherein the structure is configured to contact a lower surface of a lower-most tube on the at least one vertically extending guide.

Aspect 21: The apparatus of aspect 20, wherein the structure comprises at least one lifting arm that extends across the plurality of plurality of vertically extending guides.

Aspect 22: The apparatus of any one of aspects 19-21, wherein the plurality of vertically extending guides that are configured to empty yarn tubes thereon is a first plurality of plurality of vertically extending guides that are configured to empty yarn tubes thereon, the apparatus further comprising a second plurality of vertically extending guides that are configured to empty yarn tubes thereon, wherein the plurality of vertically extending guides that are configured to receive packages thereon are positioned between the first and second plurality of vertically extending guides that are configured to empty yarn tubes thereon.

Aspect 23: A yarn processing system comprising:
at least one twisting machine having a plurality of rows, each row having at least one receptacle for receiving a package and a handle for moving the at least one receptacle about and between a loading position for loading the at least one receptacle and an operational position; and
an apparatus as in any one of the preceding aspects.

Aspect 24: The yarn processing system of aspect 23, further comprising a depalletizing station comprising a robotic arm, wherein the depalletizing station is configured to:
  receive a pallet comprising a plurality of yarn packages;
  remove, using the robotic arm of the depalletizing station, dunnage from the pallets; and
  load, using the robotic arm of the depalletizing station, the yarn packages from the pallet onto a rack.

Aspect 25: The yarn processing system of aspect 19 or aspect 20, further comprising:
  a heat set, wherein the heat set is configured to receive packages from the twisting machine.

Aspect 26: A system comprising:
  an apparatus as in any one of aspects 1-22; and
  a depalletizing station having a robotic arm unit that is configured to transfer yarn packages from a pallet at a first location to the rack of the apparatus.

Although the foregoing invention has been described in some detail by way of illustration and example for purposes of clarity of understanding, certain changes and modifications may be practiced within the scope of the appended claims.

What is claimed is:

1. An apparatus for servicing a twisting machine having a plurality of rows, each row having at least one receptacle for receiving a yarn package and a handle for moving the at least one receptacle about and between a loading position and an operational position, the apparatus comprising:
  an automated guided vehicle (AGV);
  a robotic arm coupled to the AGV, wherein the robotic arm comprises an end effector, wherein the end effector comprises first and second grippers that are configured to move radially outwardly from each other along a gripping axis to bias against inner surfaces of a tube of a yarn package or an empty tube, wherein the first and second grippers define therebetween a channel, wherein the first and second grippers are configured to move toward each other along the gripping axis to at least partly enclose a handle of a row of the plurality of rows;
  a rack carried by the AGV, wherein the rack is configured to hold a plurality of empty tubes and a plurality of yarn packages; and
  at least one controller that is configured to cause the robotic arm to:
    grip, by the end effector, the handle of the row of the plurality of rows of the twisting machine;
    lower, by the handle, the at least one receptacle to the loading position;
    remove, by the end effector, an empty tube from a first receptacle of the at least one receptacle;
    place the empty tube on the rack;
    lift, by the end effector, a yarn package from the rack;
    place the yarn package on the first receptacle;
    grip, by the end effector, the handle of the row of the plurality of rows of the twisting machine; and
    raise, by the handle, the at least one receptacle to the operational position.

2. The apparatus of claim 1, wherein the channel is cylindrical or generally cylindrical.

3. The apparatus of claim 2, wherein the first and second grippers define hemi-cylindrical cutouts that cooperate to define the channel, wherein the hemi-cylindrical cut-outs extend perpendicularly to the gripping axis.

4. The apparatus of claim 1, wherein the at least one receptacle further comprises a second receptacle, wherein the apparatus is configured to remove, by the end effector, the empty tube from the first receptacle while a yarn package on the second receptacle supplies yarn to the yarn twisting machine.

5. The apparatus of claim 1, wherein the robotic arm is a 6-axis robotic arm.

6. The apparatus of claim 1, further comprising a laser aligner, wherein the laser aligner is configured to scan an area to determine a location of the tube on each receptacle of the at least one receptacle of each row of the yarn twisting machine.

7. The apparatus of claim 6, wherein the laser aligner is configured to scan across a line that extends along a scanning axis, wherein the at least one controller is configured to cause the robotic arm to move the laser aligner along an axis perpendicular to the scanning axis.

8. The apparatus of claim 1, wherein the at least one controller is configured to cause the apparatus to:
  navigate to a rack drop-off location; and
  decouple the rack from the AGV.

9. The apparatus of claim 8, wherein the rack is configured to couple to the AGV by resting on top of the AGV, wherein the AGV is configured to lower to decouple the rack from the AGV.

10. The apparatus of claim 1, wherein the AGV is configured to navigate to a rack having yarn packages thereon.

11. The apparatus of claim 1, wherein the rack comprises a plurality of vertically extending guides that are configured to receive packages thereon.

12. The apparatus of claim 11, wherein the plurality of vertically extending guides are arranged in rows and columns.

13. The apparatus of claim 11, wherein each vertically extending guide of the plurality of vertically extending guide is configured to receive a plurality of yarn packages thereon in a stacked configuration, wherein the rack comprises a platform that is configured to lift packages upwardly along the vertically extending guides so that at least a portion of tubes of the packages of a top layer of stacked yarn packages extend above the respective vertically extending guides.

14. The apparatus of claim 1, wherein the rack comprises a plurality of vertically extending guides that are configured to empty yarn tubes thereon.

15. The apparatus of claim 14, further comprising a structure that is configured to move along at least one vertically extending guide of the plurality of vertically extending guides that are configured to empty yarn tubes thereon, wherein the structure is configured to contact a lower surface of a lower-most tube on the at least one vertically extending guide.

16. The apparatus of claim 15, wherein the structure comprises at least one lifting arm that extends across the plurality of vertically extending guides.

17. A yarn processing system comprising:
  at least one twisting machine having a plurality of rows, each row having at least one receptacle for receiving a package and a handle for moving the at least one receptacle about and between a loading position for loading the at least one receptacle and an operational position; and
  an apparatus as in claim 1.

18. The yarn processing system of claim 17, further comprising a depalletizing station comprising a robotic arm, wherein the depalletizing station is configured to:
  receive a pallet comprising a plurality of yarn packages;

remove, using the robotic arm of the depalletizing station, dunnage from the pallets; and load, using the robotic arm of the depalletizing station, the yarn packages from the pallet onto a rack.

19. The yarn processing system of claim 18, further comprising:

a heat set, wherein the heat set is configured to receive packages from the twisting machine.

20. A system comprising:

an apparatus as in claim 1; and a depalletizing station having a robotic arm unit that is configured to transfer yarn packages from a pallet at a first location to the rack of the apparatus.

21. An apparatus for servicing a twisting machine having a plurality of rows, each row having at least one receptacle for receiving a yarn package and a handle for moving the at least one receptacle about and between a loading position and an operational position, the apparatus comprising:

an automated guided vehicle (AGV);

a robotic arm coupled to the AGV, wherein the robotic arm comprises an end effector;

a rack carried by the AGV, wherein the rack is configured to hold a plurality of empty tubes and a plurality of yarn packages; and at least one controller that is configured to cause the robotic arm to:

grip, by the end effector, the handle of a row of the plurality of rows of the twisting machine;

lower, by the handle, the at least one receptacle to the loading position by moving the end effector along an arcuate path having a constant radius;

remove, by the end effector, an empty tube from a first receptacle of the at least one receptacle;

place the empty tube on the rack;

lift, by the end effector, a yarn package from the rack;

place the yarn package on the first receptacle;

grip, by the end effector, the handle of the row of the plurality of rows of the twisting machine; and raise, by the handle, the at least one receptacle to the operational position.

22. An apparatus for servicing a twisting machine having a plurality of rows, each row having at least one receptacle for receiving a yarn package and a handle for moving the at least one receptacle about and between a loading position and an operational position, the apparatus comprising:

an automated guided vehicle (AGV);

a robotic arm coupled to the AGV, wherein the robotic arm comprises an end effector;

a rack carried by the AGV, wherein the rack is configured to hold a plurality of empty tubes and a plurality of yarn packages; and at least one controller that is configured to cause the robotic arm to:

grip, by the end effector, the handle of a row of the plurality of rows of the twisting machine;

lower, by the handle, the at least one receptacle to the loading position;

remove, by the end effector, an empty tube from a first receptacle of the at least one receptacle;

place the empty tube on the rack;

lift, by the end effector, a yarn package from the rack;

place the yarn package on the first receptacle;

grip, by the end effector, the handle of the row of the plurality of rows of the twisting machine; and raise, by the handle, the at least one receptacle to the operational position, wherein the at least one controller stores a plurality of movement patterns that correspond to respective travel paths for a plurality of different yarn twisting machines, wherein the respective travel paths correspond to a movement of the handle of each row of a respective yarn twisting machine when moving the at least one receptacle about and between the loading position and the operational position, wherein the at least one controller permits selection between movement patterns of the plurality of movement patterns.

23. An apparatus for servicing a twisting machine having a plurality of rows, each row having at least one receptacle for receiving a yarn package and a handle for moving the at least one receptacle about and between a loading position and an operational position, the apparatus comprising:

an automated guided vehicle (AGV);

a robotic arm coupled to the AGV, wherein the robotic arm comprises an end effector;

a rack carried by the AGV, wherein the rack is configured to hold a plurality of empty tubes and a plurality of yarn packages; and at least one controller that is configured to cause the robotic arm to:

grip, by the end effector, the handle of a row of the plurality of rows of the twisting machine;

lower, by the handle, the at least one receptacle to the loading position;

remove, by the end effector, an empty tube from a first receptacle of the at least one receptacle;

place the empty tube on the rack;

lift, by the end effector, a yarn package from the rack;

place the yarn package on the first receptacle;

grip, by the end effector, the handle of the row of the plurality of rows of the twisting machine; and raise, by the handle, the at least one receptacle to the operational position wherein the rack comprises a plurality of vertically extending guides that are configured to receive packages thereon, wherein each vertically extending guide of the plurality of vertically extending guide is configured to receive a plurality of yarn packages thereon in a stacked configuration, wherein the rack comprises a platform that is configured to lift packages upwardly along the vertically extending guides so that at least a portion of tubes of the packages of a top layer of stacked yarn packages extend above the respective vertically extending guides, wherein the rack comprises a scissor lift that is configured to move the platform upwardly and downwardly, wherein the scissor lift comprises an actuation arm, wherein movement of the actuation arm along a horizontal axis causes vertical movement of the platform, wherein the AGV is configured to move the actuation arm.

\* \* \* \* \*